Oct. 14, 1958     H. C. FOSTER     2,855,827
GUN MOUNTS

Filed Dec. 2, 1954     2 Sheets-Sheet 1

INVENTOR;
HARRY CLARK FOSTER,

BY Bruninga and Sutherland
ATTORNEYS.

Oct. 14, 1958 H. C. FOSTER 2,855,827
GUN MOUNTS
Filed Dec. 2, 1954 2 Sheets-Sheet 2

INVENTOR
HARRY CLARK FOSTER,
BY Bruninga and Sutherland,
ATTORNEYS.

United States Patent Office 2,855,827
Patented Oct. 14, 1958

2,855,827
GUN MOUNTS

Harry Clark Foster, Rosewood Heights, Ill., assignor to Olin Mathieson Chemical Corporation, East Alton, Ill., a corporation of Virginia Application December 2, 1954, Serial No. 472,631

3 Claims. (Cl. 89—41)

This invention relates generally to guns, and more particularly to gun mounts of the type disclosed in my copending application, Serial No. 400,431, filed December 28, 1953, of which this is a continuation-in-part.

The application referred to describes a gun mount for an eight-gauge gun of the type used in breaking up the clinker rings that form in a rotary kiln. In use, the gun is mounted at the end of the kiln and fired at a rapid rate, usually one operator being engaged in aiming the gun while another loads it. The particular mount described has a gear type of training adjustment, but in some instances, the operator prefers the faster action of a free swinging training adjustment. Accordingly, the present invention is directed to the provision of a mount that incorporates training gears that can be quickly and conveniently engaged or disengaged by the operator.

Briefly, a barrel carriage is mounted over a recessed platform by means providing for relative swinging movement about a vertical axis. The underlying platform carries in its recess a worm screw and cooperating worm wheel, the latter being journaled upon a vertical axis. The worm wheel in turn drives an overlying pinion, which extends into an overlying recess of the carriage and is in mesh with a gear segment fixed to the overlying barrel carriage. The carriage and platform form gear housing halves in slidable relationship with their recesses facing each other and each recess closed at the sliding point by the other half. The recesses together form a protectively closed gear chamber for the mount.

In the attainment of the aforestated object of the invention, the pinion is releasably coupled to the worm wheel by an axially movable clutch element. More specifically, the pinion is fixed upon a shaft, the lower end of which extends into and is keyed to an axially movable clutch sleeve. The lower end of the sleeve is formed as a knob, which is accessible beneath the platform for movement between advanced and retracted position. The sleeve extends through the worm wheel, and the upper end of the sleeve is formed with external teeth. The teeth on the sleeve, in turn, are designed to mesh with internal projections formed in the hub of the worm wheel when the sleeve is retracted, and to disengage when the sleeve is advanced. A detent may be provided to hold the sleeve in its advanced position, thereby to permit free swinging of the barrel carriage on its platform.

Other features of the invention will be in part apparent from and in part pointed out in the following detail detail description, taken in connection with the accompanying drawings, in which.

Figure 1:
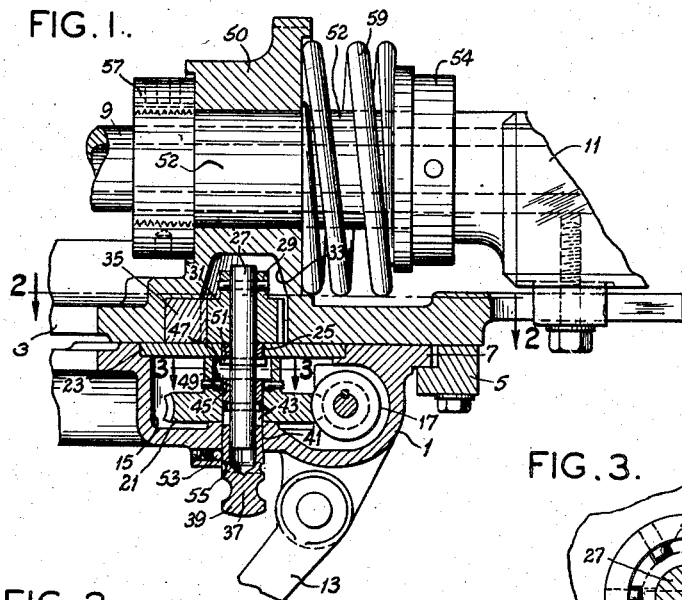
Fig. 1 is a vertical section illustrating portions of the training apparatus embodying the invention.
Figure 2:
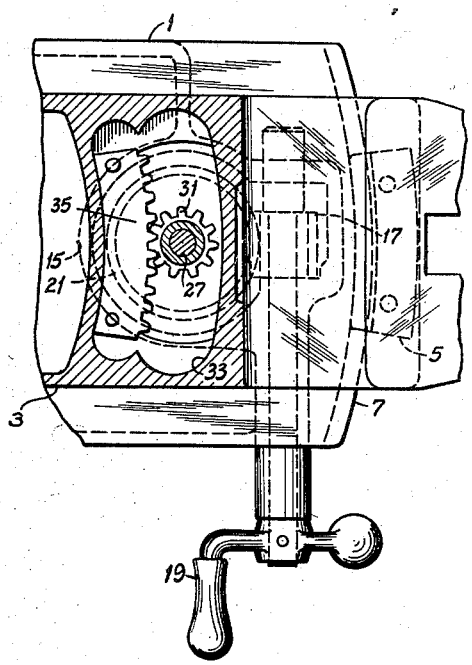
Fig. 2 is a horizontal section taken on the line 2—2 of Fig. 1.
Figure 3:
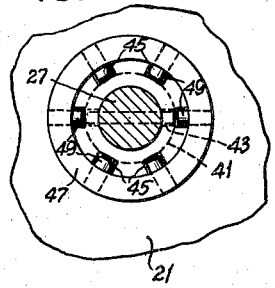
Fig. 3 is an enlarged detail section taken on the line 3—3 of Fig. 1.

Reference is made to the aforementioned patent application for a complete disclosure of a gun mount of the type with which the present invention is employed. For purposes of the present disclosure, it is sufficient to note that the gun mount is of a type adapted to be hung against one of the vertical end walls of a kiln so as to support the gun in a position for firing through a port provided for the purpose. The mount includes a platform which is hinged for swinging movement about a horizontal axis, a turn buckle type of elevation adjustment usually being provided. The platform in turn supports a gun carriage element which is mounted over the platform for swinging movement about a vertical axis, suitable spring mechanism being provided to absorb recoil.

Referring to the drawings, a portion of the gun platform is shown at 1 and a portion of the overlying carriage is shown at 3. The carriage is pivoted to the platform at a point (not shown) forward of the training adjustment (or to the left as viewed in Fig. 1), and has a sliding cooperation with the platform at the rear end adjacent the training mechanism. A retaining rail 5 may be affixed to the carriage so as to underlie a flange 7 formed at the rear of the platform. The carriage supports the barrel, part of which is shown at 9; and the receiver, part of which is shown at 11, projects rearwardly from the barrel. The receiver normally includes a handle (not shown) for opening the breech and to facilitate aiming the gun. It will be understood that the platform is hinged upon a supporting bracket (not shown) for vertical movement about a horizontal axis at the forward end and is supported at its rear end by a leg partly shown at 13.

Training adjustment is achieved by means of certain gear mechanism, or altenrnatively, by swinging the gun manually from the rear handle with the training gears disconnected. More particularly, the platform is formed with an upwardly opening cavity 15, and a worm screw 17 extends transversely through a portion of the cavity 15. The screw is manipulated by an exterior handle 19, and is internally engaged with a worm wheel 21. A partition plate 23 closes the cavity but for a bearing opening 25 through which extends a shaft 27. The shaft 27 is keyed at 29 to a pinion 31, the pinion being contained within a downwardly-opening cavity 33 formed in the barrel carriage 3. The carriage 3 also contains a fixed large-radius gear segment 35, which is in mesh with the pinion 31 so that rotation of the pinion causes the rear portion of the carriage 3 to be moved laterally with respect to the platform 1.

The pinion 31 is releasably connected to the worm wheel 21 by means of a clutch sleeve 37, which telescopes between the pinion shaft 27 and the worm wheel 21. A knob portion 39 formed on the lower end of the sleeve projects beneath the platform for manipulation by the operator, whereas the sleeve extends upwardly at 41 within the worm wheel and is slidably keyed in a slot 43 to the pinion shaft 27. The upper end 45 of the sleeve is then milled to provide outwardly projecting teeth, which are received within a recessed hub portion 47 of the worm wheel. Pins 49 are affixed to project inwardly from the hub near one end thereof, whereas the other end is relatively open to accommodate the teeth 45 when the clutch sleeve is pushed inwardly. A retaining pin 51 extending through the pinion shaft 27 holds the pinion against vertical displacement.

When the clutch sleeve is retracted, as illustrated in Fig. 1, the teeth 45 thereof are meshed with the internal teeth-like elements 49 of the worm wheel. Manipulation of the handle 19 rotates the worm and worm wheel. The worm wheel is keyed to the pinion 31 through parts 47, 49, 45, 37, 43, 27 and 29, hence the pinion moves the gear segment 35 to one side or the other, depending upon the direction in which the crank handle 19 is turned.

If it is desired to disengage the training gears, the knob 39 of the clutch sleeve is advanced so that the teeth 45 move upwardly free of the pins 49. The clutch sleeve may then be releasably held in its advanced position, as by a spring pressed detent ball 53, which enters a detent groove 55 when the sleeve is moved upwardly to unlock the training gears. In that event, the barrel carriage may be swung horizontally by direct manipulation of the receiver 11. The training gears are readily re-engaged, however, by retracting the clutch sleeve while the handle 19 is given a few turns or while oscillating the receiver 11.

As in the aforementioned application, the recoil mechanism is shown in Fig. 1 to include a rear barrel-supporting shoulder 50 which slidably receives a bearing 52. This bearing has a rearwardly spaced head 54 and a forwardly disposed nut 57. A rebound spring 59 is compressed between the shoulder 50 and the head 54. The nut 57, as described in the aforementioned application, is of the spanner wrench type and it has a slot cut radially and then concentrically over an arc, so as to free a section of the threads for inward movement with respect to the main body of the nut. A pair of set screws are located over this section, and when these screws are tightened, the nut becomes locked in position without damage to the threads.

Figure 4:
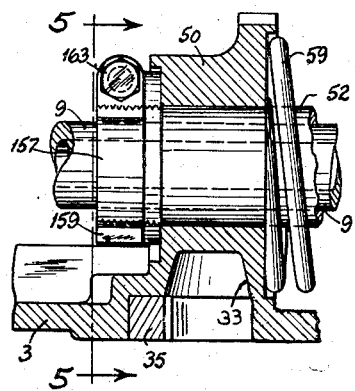
Fig. 4 is a detail view similar to that of Fig. 1 illustrating an alternative embodiment.
Figure 5:
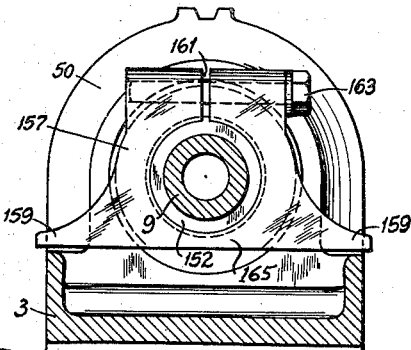
Fig. 5 is a section taken on the line 5—5 of Fig. 4.

In Figs. 4 and 5, a different arrangement is illustrated. In this instance, the nut 157 is formed with feet 159 which overlie opposite sides of the barrel carriage 3, thereby to prevent rotation of the nut when the bearing sleeve 52 is turned. The upper portion of the nut is split at 161 and a bolt 163 extends across the split section so that the inner threads can be tightened to lock the nut on the bearing 52. It will be noted that the lower portion 165 of the nut opposite the split 161 is of reduced cross section so as to facilitate contraction about the bearing by means of the bolt 163.

Figure 6:
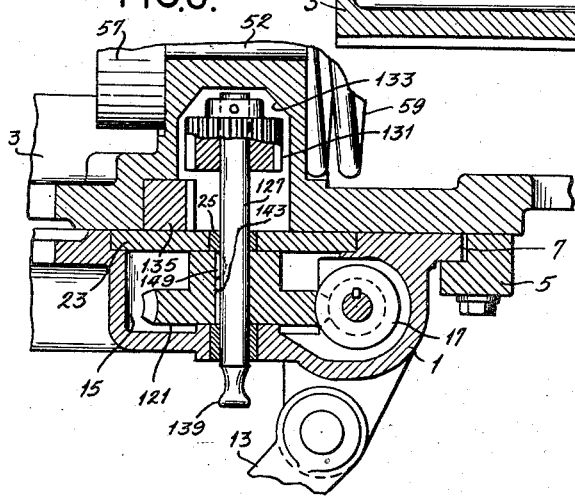
Fig. 6 is a detail view similar to that of Fig. 1, but showing an alternative type of sliding clutch.

From the foregoing description, it is apparent that those skilled in the art will understand the structure, function and mode of operation of the invention herein disclosed, and appreciate the advantages thereof. Although several embodiments have been disclosed in detail, it is to be understood that the invention is not limited thereto, but the drawings and description thereof are to be understood as being merely illustrative. For example, Fig. 6 illustrates a different arrangement of the gear system for training control. In this instance, the shaft 127 is moved vertically to disengage the pinion 131 from the gear segment 135. A Woodruff key 149 is secured in the shaft to slide within a keyway 143 in the worm wheel 121. When the knob 139 of the shaft is advanced, the key 149 moves to an upper position in the keyway 143, and the pinion 131 is disengaged, as shown. The knob 139 may be pulled down to engage the pinion, however, the key 149 then sliding to the lower port of its keyway. The cavity 133 necessarily must be of a size sufficient to accommodate both extremes of movement of said carriage relative to the pinion, and the pinion is fixed to the shaft. It is realized that many modifications and variations will present themselves to those skilled in the art without departing from the spirit of this invention or the scope thereof as set forth in the appended claims.

Having thus described the invention, what is claimed and desired to be secured by Letters Patent is:

1. In a training gun mount for a kiln gun of the character disclosed, a lower housing section which is relatively fixed against horizontal movement, a movable upper housing section adapted to carry a gun and slide horizontally over said bottom section, said housing sections being recessed at their parting faces to form a gear chamber therebetween which chamber is peripherally closed by the abutting faces of said sections, a gear segment fixed within said chamber to said upper section in a plane parallel to said parting faces, a shaft rotatably journalled on said lower section to extend within said chamber, said shaft having fixed thereon an upper pinion in mesh within said chamber with said gear segment and having rotatably mounted thereon a lower worm wheel disposed within said chamber, a worm rotatably journalled in said lower section of the housing to extend horizontally therethrough within said chamber for manual rotation, a portion of said worm being in mesh with said worm wheel within said gear chamber, and means disengageably keying said worm wheel to said shaft for driving said pinion, thereby moving said upper section.

2. Apparatus as set forth in claim 1, wherein the keying means further includes operator-control means projecting to the exterior of the housing sections through said lower section of the housing from said shaft, said control means being adapted for movement from a first position wherein the worm is connected with said gear segment to a second position wherein the worm is disconnected from said gear segment, thereby to permit manual movement of the upper section of the housing independently of said gear train.

3. In a training gun mount of the character disclosed, a lower housing section which is relatively fixed against horizontal movement, a movable upper housing section adapted to carry a gun and slide horizontally over said lower section, said lower housing section being formed with an upwardly-opening recess, an apertured closure plate extending across the top of said recess, a shaft journalled vertically in said lower housing section and in said aperture of said plate to project above said plate in movable relationship with said upper section, a downwardly-opening recesss formed in said upper housing section in which said upwardly-projecting portion of said shaft is received, a gear segment fixed within said downwardly-opening recess to said upper section of the housing adjacent said shaft, a pinion carried on the upper end of said shaft in mesh with said gear segment, a worm wheel carried on the lower portion of said shaft at the lower housing section, and a worm journalled horizontally in said lower housing section in mesh with said worm wheel, said downwardly-opennig recess being of a size sufficient to accommodate movement of said upper section relative to said pinion; and said lower section having a sufficient unrecessed sliding face engaging with said upper section to maintain said downwardly-opening recess closed.

References Cited in the file of this patent

UNITED STATES PATENTS

| | | |
|---|---|---|
| 558,724 | Fiske | Apr. 21, 1896 |
| 882,988 | Aloyos et al. | Mar. 24, 1908 |
| 923,207 | Sjoquist | June 1, 1909 |
| 1,371,891 | Haller | Mar. 15, 1921 |
| 1,523,662 | Schneider | Jan. 20, 1925 |
| 1,550,416 | Barling | Aug. 18, 1925 |
| 1,856,987 | Elsea | May 3, 1932 |